UNITED STATES PATENT OFFICE.

THOMAS BROOKS, OF CANTON, OHIO, ASSIGNOR OF ONE-HALF HIS RIGHT TO CORNELIUS AULTMAN, OF SAME PLACE.

IMPROVEMENT IN THE MANUFACTURE OF STEEL.

Specification forming part of Letters Patent No. 147,221, dated February 3, 1874; application filed October 10, 1873.

*To all whom it may concern:*

Be it known that I, THOMAS BROOKS, of Canton, in the county of Stark and State of Ohio, have invented certain new and useful Improvements in the Manufacture of Steel, of which the following is a full, clear, and exact description:

The first part of the invention consists of an improvement in the means of producing a "welding steel," or a steel of high grade, possessing toughness and malleability, and adapted to purposes in which a fine quality of steel is required, as well as to ordinary purposes, and at the same time will weld without the use of fluxes or chemicals. The invention further consists in the production of a steel of great fineness, and great toughness, or tenacity, that will weld without the use of a flux.

The means used for these purposes are the following: I take seventy-six pounds of bar-iron, half an ounce of tungstate of soda, eight ounces of spiegeleisen, eight ounces of charcoal, and three-quarters of an ounce of manganese, and subject them to the usual treatment employed in converting processes in a smelting-pot. But I do not wish to be limited to these proportions, as they may be varied to suit the grade or quality of the iron employed, and the quality of the steel to be produced.

What I claim as new, and desire to secure by Letters Patent, is—

1. The use of tungstate of soda, spiegeleisen, charcoal, and manganese, in the manufacture of steel, substantially as set forth.

2. In the process of converting iron into steel, the use of tungstate of soda, substantially as described.

THOMAS BROOKS.

Attest:
    GEO. W. RAFF,
    P. J. SOWERS.